US00RE42450E

(19) United States
(12) Reissued Patent
Hsu et al.

(10) Patent Number: US RE42,450 E
(45) Date of Reissued Patent: Jun. 14, 2011

(54) MODULE OF REFLECTION MIRRORS OF L-SHAPE

(75) Inventors: Chuan-Yu Hsu, Hsinchu (TW); Chih-Wen Huang, Hsinchu (TW)

(73) Assignee: Transpacific Systems, LLC, Wilmington, DE (US)

(21) Appl. No.: 11/267,888

(22) Filed: Nov. 4, 2005

Related U.S. Patent Documents

Reissue of:
(64) Patent No.: 6,641,272
Issued: Nov. 4, 2003
Appl. No.: 10/142,565
Filed: May 8, 2002

(51) Int. Cl.
*G02B 5/08* (2006.01)

(52) U.S. Cl. ..... 359/857; 359/856; 359/858

(58) Field of Classification Search ..... 359/854–858, 359/860
See application file for complete search history.

(56) References Cited

U.S. PATENT DOCUMENTS 5,130,856 A * 7/1992 Tichenor et al. ..... 359/857
5,223,984 A * 6/1993 Schmid ..... 359/855
5,541,771 A * 7/1996 Bohn ..... 359/634
5,930,048 A * 7/1999 Kaneko ..... 359/634
6,481,860 B1 * 11/2002 Chang ..... 359/867
6,486,459 B1 * 11/2002 Taillie ..... 250/208.1
6,575,600 B2 * 6/2003 Huang et al. ..... 359/857

* cited by examiner

*Primary Examiner* — Euncha P Cherry
(74) *Attorney, Agent, or Firm* — Stolowitz Ford Cowger LLP

(57) ABSTRACT

A module of reflection mirrors of L-shape according to the invention, arranged in an optical chassis of scanner, is comprised of a first L-shaped mirror and a second L-shaped mirror. The recession portions for the second L-shaped mirror and the first L-shaped mirror are corresponded to each other in the space. After entering the module with a specific angle, an incident light is reflected several times between the two L-shape mirrors before it leaves the module with another angle again. Wherein, there are a first reflection zone and a second reflection zone at the recession portion of the first L-shaped mirror, and there are a third reflection zone and a fourth reflection zone at the recession portion of the second L-shaped mirror. After entering the module with a specific angle, the incident light passes through the second reflection zone, the third reflection zone, the fourth reflection zone, the second reflection zone, the first reflection zone, the fourth reflection zone, and the third reflection zone in sequence to get an appropriate optical length. Then, the reflection light leaves the module of reflection mirrors of L-shape with another angle that is different from the entering angle and is then focused into an image on a CCD by a lens.

21 Claims, 5 Drawing Sheets

MODULE OF REFLECTION MIRRORS OF L-SHAPE

Matter enclosed in heavy brackets [ ] appears in the original patent but forms no part of this reissue specification; matter printed in italics indicates the additions made by reissue.

FIELD OF THE INVENTION

The invention relates to a module of reflection mirrors, especially to a module of reflection mirrors of L-shape in an optical chassis of scanner, wherein a light is reflected in the module of reflection mirrors of L-shape to form a specific constant length of path for facilitating a scanned document to be focused into an image.

BACKGROUND OF THE INVENTION

A scanner of prior arts as shown in FIG. 1 has a main body 2, of which surface has a transparent platen 3, and inside which has an optical chassis 5 capable of repetitious displacement. A document 4 is placed on the transparent platen 3 and is covered by a cover 1, and at this time, the optical chassis 5 in the main body 2 is displaced from one side of the platen 3 to scan the data of the document 4 for picking up image, and its motion is shown in FIG. 2.

In order to obtain appropriate optical length within specific volume for above-mentioned optical chassis 5, inside which plural reflection mirrors are arranged for obtaining appropriate optical length to make the reflection light be focused into an image onto a CCD by a lens.

Please refer to FIG. 3, which shows an example that plural mirrors reflect the light to obtain appropriate optical length. In this structure, a first light source 501 irradiates a light toward a document 4, and the light is reflected toward the first mirror 502, the second mirror 503, and the third mirror 504 in sequence to be focused into an image afterwards on the first CCD 506 by the first lens 505. In this example, three reflection mirrors guide the light to obtain an appropriate optical length, thereby the volume of the optical chassis 5 is reduced, and therefore, someone applies the same principle with further more mirrors to achieve this object. Thus, following the increasing number of components, the position problem is incurred more frequently, because a supporting point is needed for each mirror. Thus, when assembling each mirror, the accumulated tolerance of each mirror makes the position for each mirror become more difficult and the malfunction for components is incurred more frequently. Furthermore, the increasing number of components will complicate the filing and stocking works for supplies relatively, and the cost of supplies is also increased, so the price competition ability for this product is weak.

In addition, although there is also a design of multi-reflection by single mirror or parallel mirrors, but it is independent between each mirror, so the fixation for the relative positions and angles between each mirror becomes a main factor to accumulate tolerance.

Accordingly, the inventor addresses an ingenious design of a module of reflection mirrors of L-shape 508 that can effectively improve above-mentioned shortcomings.

SUMMARY OF THE INVENTION

The main object of the invention is to provide a module of reflection mirrors of L-shape to combine mirrors and simplify components by applying an L-shaped structure, therefore, to reduce the manufacture cost and the assembling tolerance during manufacture and assembly.

In order to describe the operational principle of the module of reflection mirrors of L-shape proposed by the invention in more clear way, a detail description cooperated with referential drawings is presented as follows.

DETAILED DESCRIPTION OF THE PREFERRED EMBODIMENTS

A module of reflection mirrors of L-shape according to the invention is provided to combine mirrors and simplify components and, therefore, to reduce the manufacture cost and the assembling tolerance during manufacture and assembly.

Figure 1:
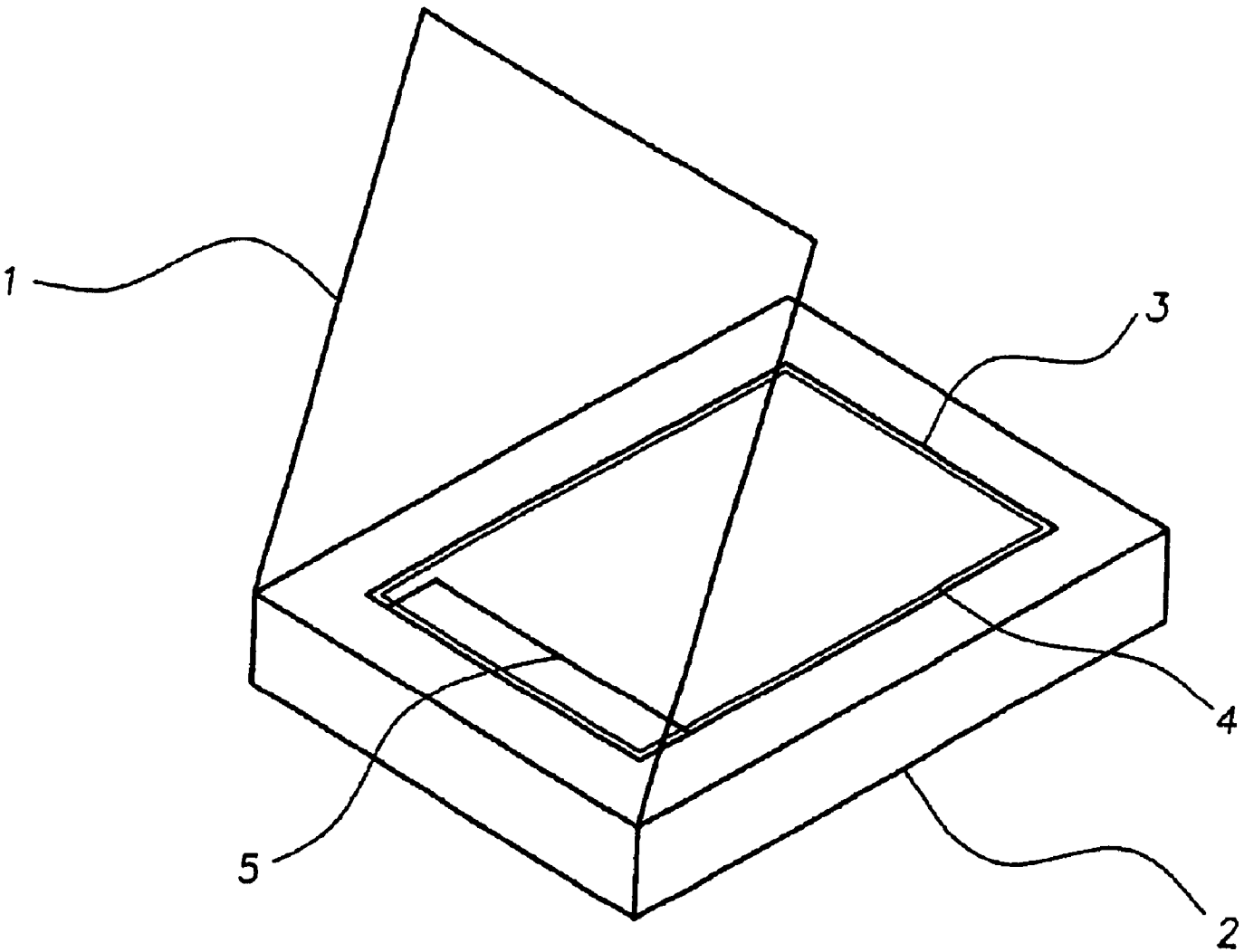
FIG. 1 is a three-dimensional view for a scanner.
Figure 2:
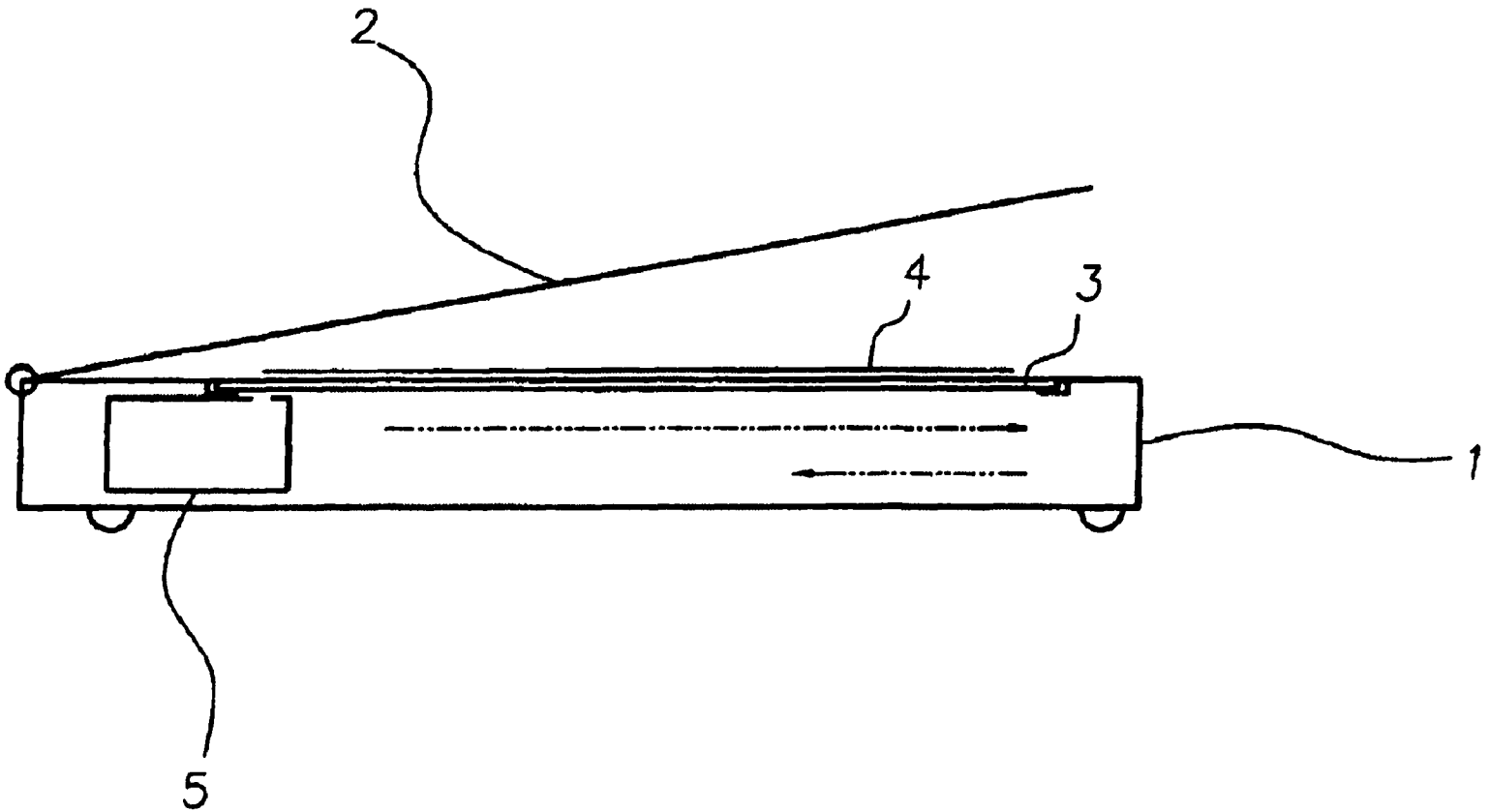
FIG. 2 is a plan side view for a scanner.
Figure 3:
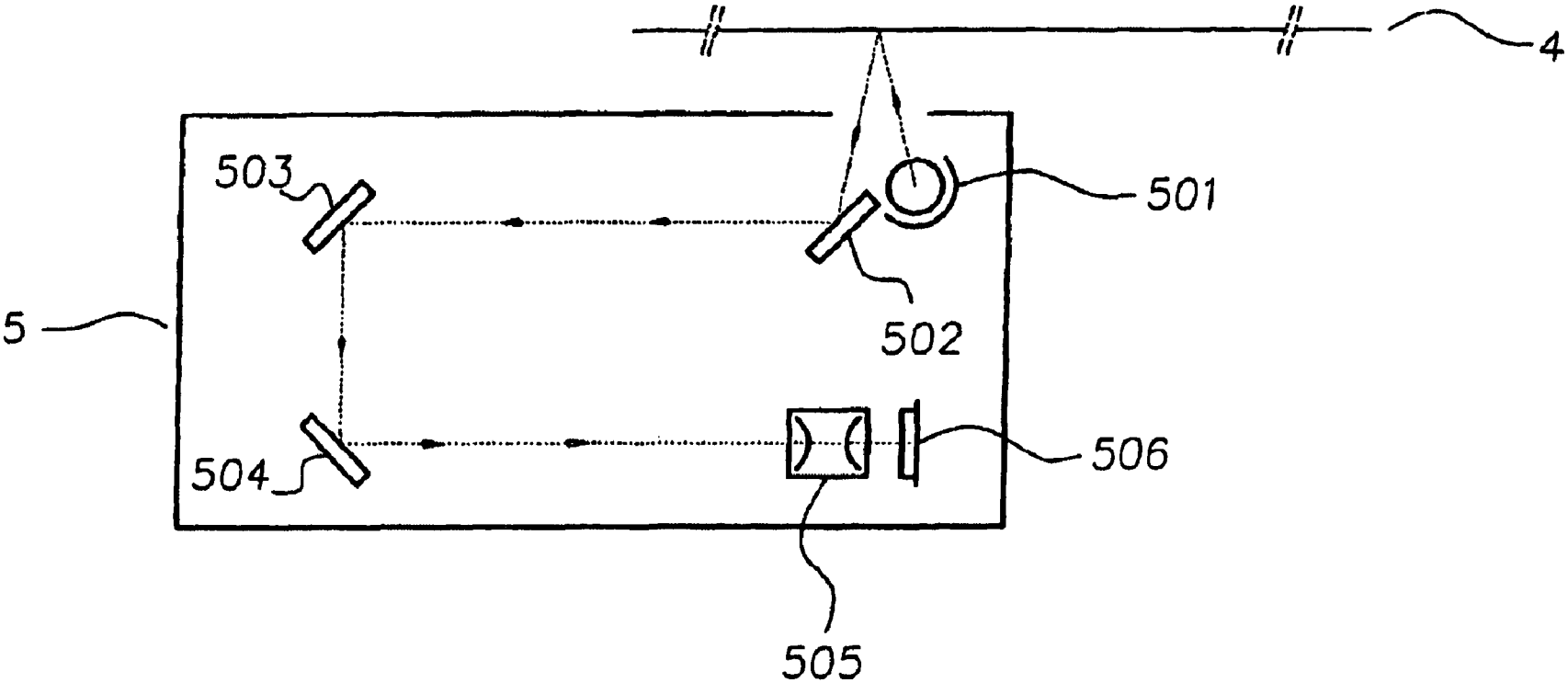
FIG. 3 (Prior Art)
FIG. 3 is an illustration for image picking-up of an optical chassis of scanner according to the prior arts.

A scanner according to the invention as shown in FIG. 1 has a main body 2, of which surface has a transparent platen 3, and inside which has an optical chassis 5 capable of repetitious displacement. A document 4 is placed on the transparent platen 3 and is covered by a cover 1, and at this time, the optical chassis 5 in the main body 2 is displaced from one side of the platen 3 to scan the data of the document 4 for picking up image thereof, and its motion is shown in FIG. 2.

In order to obtain appropriate optical length within specific volume for above-mentioned optical chassis 5, inside which a module of reflection mirrors of L-shape 508 is arranged for obtaining appropriate optical length to make the reflection light be focused into an image onto a CCD by a lens.

Figure 4:
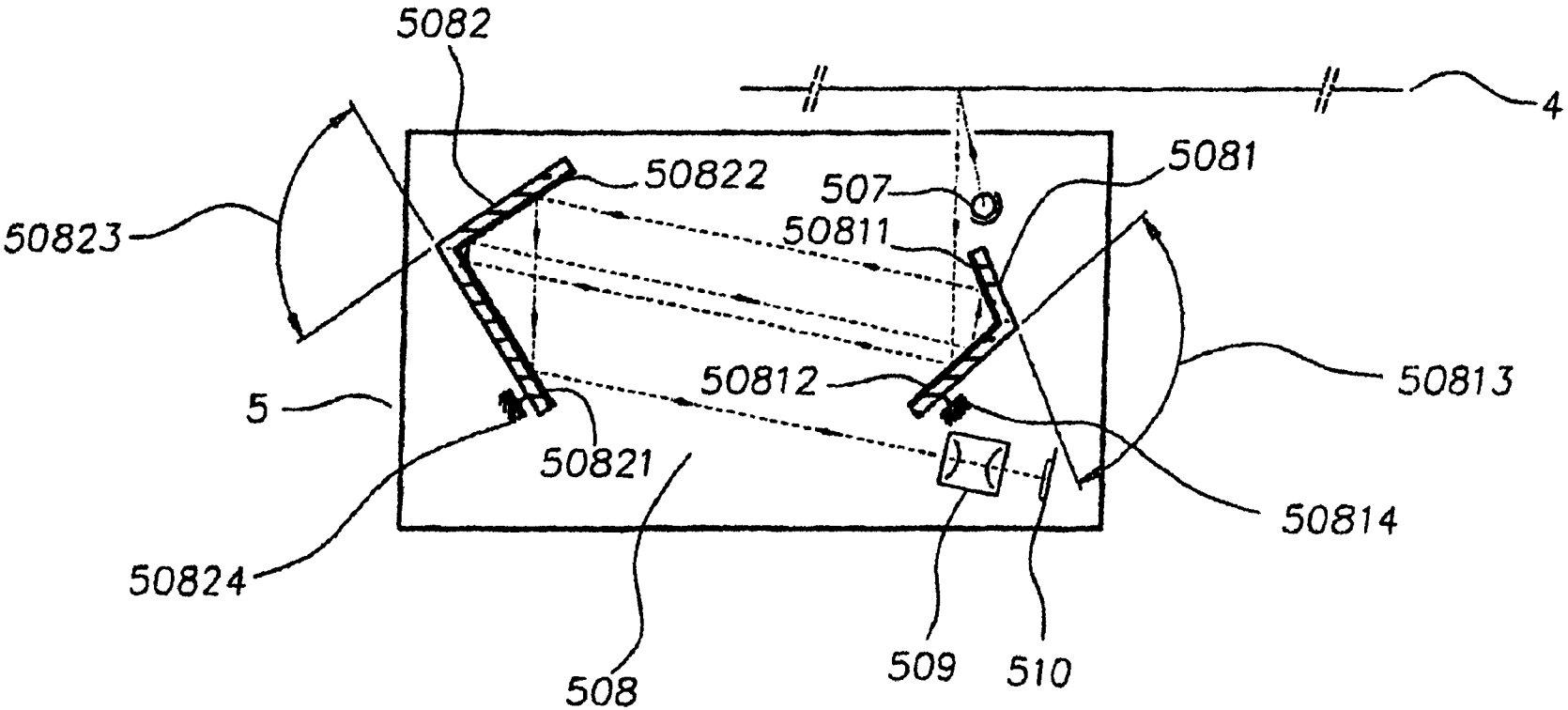
FIG. 4 is an illustration for image picking-up of the first embodiment of an optical chassis of scanner according to the invention.

Please refer to FIG. 4. The structure of the module of reflection mirrors of L-shape 508 is comprised of a first L-shaped mirror 5081 and a second L-shaped mirror 5082. The second L-shaped mirror 5082 and the first L-shaped mirror 5081 are arranged in the optical chassis 5 and their recession portions are corresponded to each other. A second light source 507 irradiates a light toward the document 4, the picked-up data on the document 4 is formed as an incident light entering into the module of reflection mirrors of L-shape with a specific angle. After inter-reflected between the first L-shaped mirror 5081 and the second L-shaped mirror 5082, the reflective light leaves the set with another angle and is focused into an image onto a second CCD 510 by a second lens 509.

The design of optical length of said module of reflection mirrors of L-shape 508 is as follows: a first reflection zone 50811 is located at the upper portion of the first L-shaped mirror, while a second reflection zone 50812 is located at the lower portion thereof; a third reflection zone is located at the lower portion of the second L-shaped mirror, while a fourth reflection zone is located at the upper portion thereof. After entering the module, the incident light is reflected in sequence through the second reflection zone 50812, the third reflection zone 50821, the fourth reflection zone 50822, the second reflection zone 50812, the first reflection zone 50811, the fourth-reflection zone 50822, and the third reflection zone

50821 and leaves the module of reflection mirrors of L-shape 509 to be focused into an image onto the CCD 510 by the second lens 509.

One advantage of above structure is that two pieces of reflection mirror are manufactured integrally and formed into a single L-shaped mirror, such that the relative positions between two reflection mirrors (zones) are very accurate if the precision of manufacture is high enough. For the first L-shaped mirror 5081, a first angle 50813 is formed between the first reflection zone 50811 and the second reflection zone 50812, and if it is separated into two mirrors, each which has to be fixed with a fixation seat, so the accumulated tolerance after two mirrors being assembled is larger than the tolerance of one single integrated structure. Similarly, for the second L-shaped mirror 5082, a second angle 50823 is formed between the third reflection zone 50821 and the fourth reflection zone 50822 and, since it is formed integrally, so the accuracy of the second angle 50823 is more accurate than that of two separated mirrors. In general, the accuracy of a pair of L-shaped mirror (i.e., the first L-shaped mirror 5081 and the second L-shaped mirror 5082) that is fixed respectively by a first fixation seat 50814 and a second fixation seat 50824 is twice of that of the four mirrors that are fixed respectively by four separated fixation seats. On the other hand, this structure may simplify the number of parts, such that the supplies management and manufacture cost during manufacture are benefited.

Figure 5:
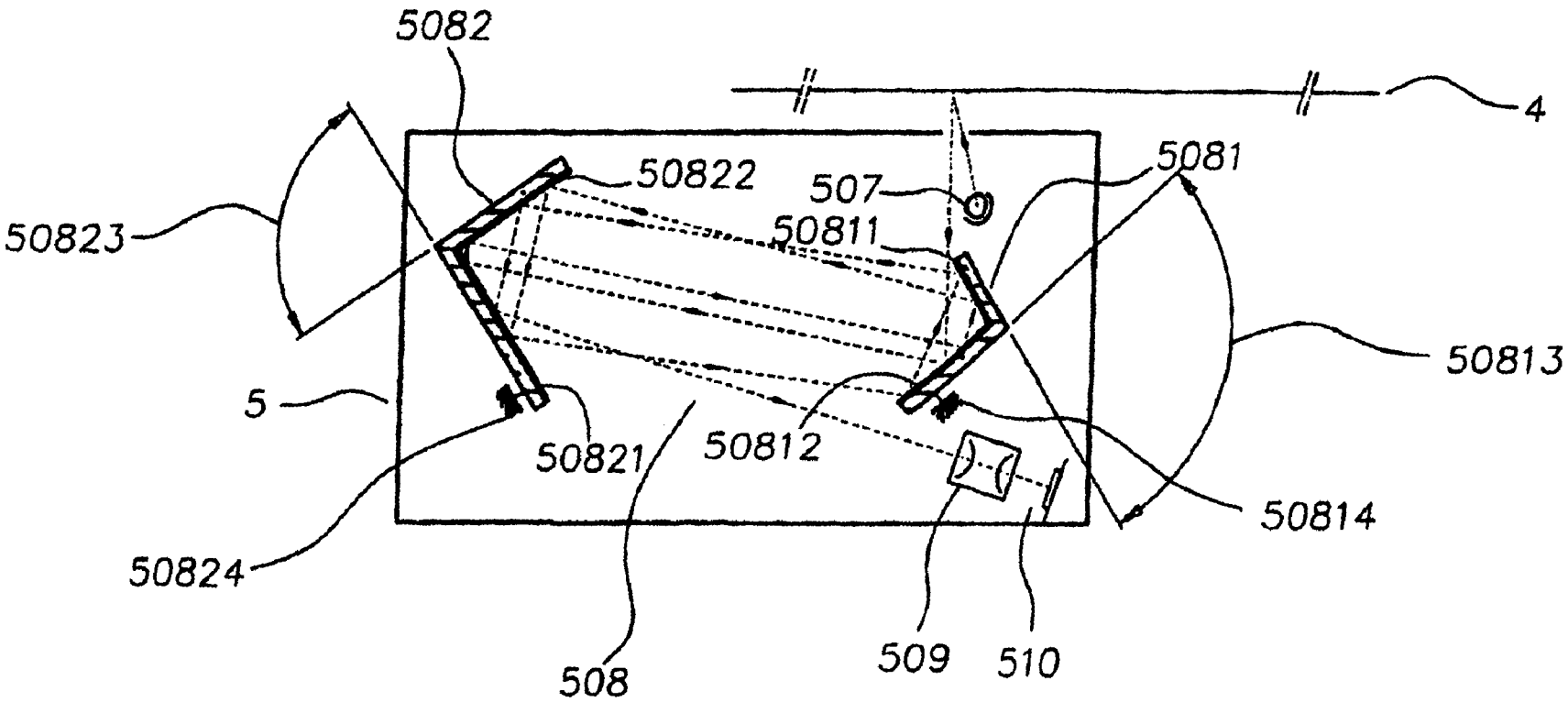
FIG. 5 is an illustration for image picking-up of the second embodiment of an optical chassis of scanner according to the invention.

Accordingly, The design of a module of reflection mirrors of L-shape 508 according to the invention may be modified simply to change its optical length for fulfilling the requirement and performance of different products, and the changing method is described as follows:

As shown in FIG. 5, after shrinking the first angle 50813 of the first L-shaped mirror 5081, following result may be obtained.

After being reflected from the document 4, the incident light enters the module with a specific angle and is reflected again in sequence through the second reflection zone 50812, the third reflection zone 50821, the fourth reflection zone 50822, the second reflection zone 50812, the first reflection zone 50811, the fourth reflection 50822, and the third reflection zone 50821, and then leaves the module of reflection mirrors of L-shape with an angle that is different from the entering angle. The optical length for this structure is different from that of aforementioned structure in that an additional round of light reflection is executed between the first L-shaped mirror 5081 and, the second L-shaped mirror 5082. Therefore, in this invention, a simple modification on the first angle 50813 may just increase the optical length simply, and which is a convenient mechanism for design, and at the same time, a simple variation of angle may make the structure fulfilled the requirement of products with different optical lengths.

As for the manufacture of above L-shaped mirrors, if the recession portion is made of metal material, it may be treated with polishing procedure to reach the object of reflection or, on the other hand, if the recession portion is made of materials of plastic or glass, a metal film may then be coated on the mirror for reflecting light.

What is claimed is:

1. A module of reflection mirrors of L-shape [is comprised of] *comprising*:

a first L-shaped mirror; *and* a second L-shaped mirror, [the] *wherein a* recession portion of [which is corresponded] *the second L-shaped mirror corresponds* to [that] *a recession portion* of the first L-shaped mirror;

wherein, after entering into the module with a specific angle, [the] incident light is inter-reflected between the first L-shaped mirror and the second L-shaped mirror[, and then leaves the module with another angle,];

wherein the recession portion of the first L-shaped mirror has a first reflection zone and a second reflection zone[;];

*wherein* the recession portion of the second L-shaped mirror has a third reflection zone and a fourth reflection zone; *and*

*wherein,* after entering the module with [a] *the* specific angle, the incident light is reflected in sequence through the second reflection zone, the third reflection zone, the fourth reflection zone, the second reflection zone, the first reflection zone, the fourth reflection zone, and the third reflection *zone*, and finally leaves the module [of reflection mirrors of L-shape] with another angle that is different from the [entering] *specific* angle.

2. The module of [reflection mirrors of L-shape according to] claim 1, wherein the recession portion of the first L-shaped mirror has a first angle[;], *wherein* the recession portion of the second L-shaped mirror has a second angle, and *wherein* different optical lengths may be obtained by changing the first angle.

[3. The module of reflection mirrors of L-shape according to claim 2, wherein, after entering the module with a specific angle, the incident light is reflected in sequence through the second reflection zone, the third reflection zone, the fourth reflection zone, the second reflection zone, the first reflection zone, the fourth reflection, and the third reflection zone, and leaves the module of reflection mirrors of L-shape with an angle different from the entering angle.]

4. The module of [reflection mirrors of L-shape according to] claim 1, wherein the first L-shaped mirror and the second L-shaped mirror are respectively formed into one body, and *wherein* each *mirror* is fixed at an appropriate position by a fixation seat.

5. The module of [reflection mirrors of L-shape according to] claim 1, wherein the first L-shaped mirror and the second L-shaped mirror are [made of material] *comprised* of metal.

6. The module of [reflection mirrors of L-shape according to] claim 1, wherein the recession portions of the first L-shaped mirror and the second L-shaped mirror are coated with a metal film.

*7. A method, comprising:*

*receiving incident light into a module with a specific angle;*

*inter-reflecting the incident light between a recession portion of a first L-shaped mirror and a recession portion of a second L-shaped mirror in sequence through a second reflection zone, a third reflection zone, a fourth reflection zone, the second reflection zone, a first reflection zone, the fourth reflection zone, and the third reflection zone, wherein the recession portion of the first L-shaped mirror includes the first and second reflection zones and the recession portion of the second L-shaped mirror includes the third and fourth reflection zones; and*

*outputting the inter-reflected light from the module with another angle that is different from the specific angle of the received incident light.*

*8. The method of claim 7, wherein the recession portion of the second L-shaped mirror corresponds to the recession portion of the first L-shaped mirror.*

*9. The method of claim 7, further comprising:*

*radiating light from a light source toward a document;*

*reflecting light from the document to the module; and*

*with a lens, focusing the outputted light onto a charge-coupled device (CCD).*

*10. The method of claim 7, further comprising obtaining different optical lengths at least by changing a first angle of the recession portion of the first L-shaped mirror.*

*11. The method of claim 7, wherein the first L-shaped mirror and the second L-shaped mirror respectively comprise one body, and wherein the first L-shaped mirror and the second L-shaped mirror are fixed at an appropriate position by a fixation seat.*

*12. The method of claim 7, wherein the first L-shaped mirror and the second L-shaped mirror comprise a metal material.*

*13. The method of claim 7, wherein the recession portions of the first L-shaped mirror and the second L-shaped mirror comprise a metal film coating.*

*14. A module of reflection mirrors comprising:*

*a first mirror; and*

*a second mirror, wherein a recession portion of the second mirror corresponds to a recession portion of the first mirror;*

*wherein the first and second mirrors are configured to receive light at a specific angle, inter-reflect incident light between the first mirror and the second mirror, and emit light from the module with another angle different from the specific angle;*

*wherein the recession portion of the first mirror includes a first reflection zone and a second reflection zone;*

*wherein the recession portion of the second mirror includes a third reflection zone and a fourth reflection zone; and*

*wherein the first and second mirrors are configured to reflect the incident light in sequence through the second reflection zone, the third reflection zone, the fourth reflection zone, the second reflection zone, the first reflection zone, the fourth reflection zone, and the third reflection zone before leaving the module.*

*15. The module of claim 14, wherein the recession portion of the first mirror includes a first angle, wherein the recession portion of the second mirror includes a second angle, and wherein the first and second mirrors are configured to form different optical lengths in response to changes in the first angle.*

*16. The module of claim 14, wherein the first mirror and the second mirror respectively comprise one body, and wherein the first mirror and the second mirror are fixed at an appropriate position by a fixation seat.*

*17. An apparatus, comprising:*

*a light source;*

*an image sensor; and*

*an optical light path comprising two reflectors configured to reflect light radiated from the light source onto the image sensor, wherein each of the two reflectors are further configured to reflect the light a plurality of times before the light is reflected onto the image sensor, and wherein one of the two reflectors comprises:*

*a first reflection zone configured to both reflect the light for a second time within the optical light path and reflect the light for a last time within the optical light path toward the image sensor; and*

*a second reflection zone configured to receive the light reflected directly from the first reflection zone.*

*18. The apparatus of claim 17, wherein an angle is formed between reflective surfaces of the first and second reflection zones.*

*19. The apparatus of claim 17, wherein at least one of the two reflectors comprises a third reflection zone and a fourth reflection zone, and wherein the optical light path is configured to reflect the light in sequence through the third reflection zone, the fourth reflection zone, and the second reflection zone before the light is reflected by the first reflection zone toward the image sensor.*

*20. The apparatus of claim 18, wherein the optical light path is configured to form different optical lengths in response to changes in the angle formed between the reflective surfaces of the first and second reflection zones.*

*21. The apparatus of claim 19, wherein a first angle is formed between reflective surfaces of the first and second reflection zones, and wherein a second angle is formed between reflective surfaces of the third and fourth reflection zones.*

*22. The apparatus of claim 21, wherein the first angle is different than the second angle.*

* * * * *